Feb. 21, 1967   D. L. GONCZY ET AL   3,305,246
ANTI-FISHTAIL DEVICE FOR TRAILER HITCH
Filed Oct. 2, 1964   2 Sheets-Sheet 1

INVENTORS
Donald L. Gonczy
BY & John S. Gonczy
Barnard, McGlynn & Reising
ATTORNEYS Feb. 21, 1967 D. L. GONCZY ET AL 3,305,246
ANTI-FISHTAIL DEVICE FOR TRAILER HITCH
Filed Oct. 2, 1964 2 Sheets-Sheet 2

INVENTORS
Donald L. Gonczy
BY & John S. Gonczy
Barnard, McGlynn & Reising
ATTORNEYS United States Patent Office 3,305,246
Patented Feb. 21, 1967

3,305,246
ANTI-FISHTAIL DEVICE FOR TRAILER HITCH
Donald L. Gonczy and John S. Gonczy, both of 24650 N. Cromwell, Franklin, Mich. 48025
Filed Oct. 2, 1964, Ser. No. 401,193
32 Claims. (Cl. 280—446)

The present invention relates to an improved anti-oscillation or oscillation dampening device. More particularly, the invention relates to a new and improved device for utilization in conjunction with the articulable connection between a towing vehicle and a towed vehicle to allow the towed vehicle to freely rotate relative to the towing vehicle, but prevents the towed vehicle from oscillating from one side to the other as the towing vehicle is moving the towed vehicle along a roadway.

There is a need for a device which will prevent a towed vehicle, such as a trailer, from weaving or fishtailing as it is being towed along a highway. The need for such a device has been fostered by the radical changes in our highway system and in the vehicles which are now normally towed along such highways. For example, the interstate highway system allows a trailer to be towed along at speeds heretofore unattainable by such vehicles. Also contributing to the need for the instant device is the size of the vehicles which are now being towed along the roadways. For example, house trailers which are being towed along the highways are of an ever increasing size.

The increased size of the vehicles being towed along highways in addition to the increased speed capabilities of such vehicles create problems with regard to the fishtailing of towed vehicles, such as a trailer, which problems are of grave concern due to the hazardous conditions which accompany such a fishtailing trailer.

There are devices which are utilized in conjunction with trailer hitches and the like to limit in some manner the relative rotatable movement between the towing vehicle and the towed vehicle. Such devices, however, usually do not affect the relative rotation between the towing vehicle and the towed vehicle until a certain degree of relative rotation has been attained. Such a limiting device does not aid in the fishtailing or oscillation of the towed vehicle since such fishtailing or oscillation are normally insufficient in magnitude to engage the limiting device. Other devices have been utilized in connection with a trailer hitch, or similar devices connecting a towing vehicle to a towed vehicle, to control the steering of the towed vehicle. The essence of the prior art devices is that they each independently have but one mode of operation wherein they retard relative rotation regardless of the type of rotation during all phases of the relative rotation between the towing vehicle and the towed vehicle or they do not affect rotation until a predetermined amount of relative rotation between the vehicles has occurred. There is, therefore, a need for a device to be utilized with a trailer hitch, or the like, between a towed and a towing vehicle whereby oscillations or fishtailing caused by forces on the trailer tending to cause it to rotate relative to the towing vehicle which are of a short duration will not be effective to cause a relative rotation between the respective vehicles, but which will allow free relative rotation between the towed and the towing vehicles upon the application of a sustained force. That is to say, there is a need in the art for a device to be utilized with a towing vehicle and a towed vehicle whereby as the vehicles are moving along the highway the device will restrain any fishtailing of the towed vehicle but when the towing vehicle accomplishes a turn the device will allow the towed vehicle to freely rotate relative to the towing vehicle.

It is, therefore, the general purpose of this invention to provide an improved anti-fishtailing or anti-oscillation device which has the advantages and capabilities not available in the prior art devices. To obtain the desired performance, the present invention contemplates the unique and novel arrangement of components and elements to provide an improved oscillation dampening device which is capable of being utilized in conjunction with two members which are relatively rotatable about a common axis to prevent oscillations between such members and to allow free relative rotation therebetween.

Accordingly, it is an object of the present invention to provide a novel anti-fishtailing device to be utilized between a towing and a towed vehicle to provide safer highway travel.

Another object of the present invention is to provide a novel oscillation dampening device to be utilized with a towing and a towed vehicle to dampen the oscillations of the towed vehicle as it is being towed along a roadway.

A further object of the present invention is to provide an anti-oscillation device which may be utilized to interconnect any two members which are rotatable relative to one another about a common axis to dampen oscillations therebetween but allows free relative rotation therebetween in response to a sustained force.

Other objects and many attendant advantages of this invention will be readily appreciated as the same becomes better understood by reference to the following detailed description when considered in connection with the accompanying drawings wherein.

Figure 1:
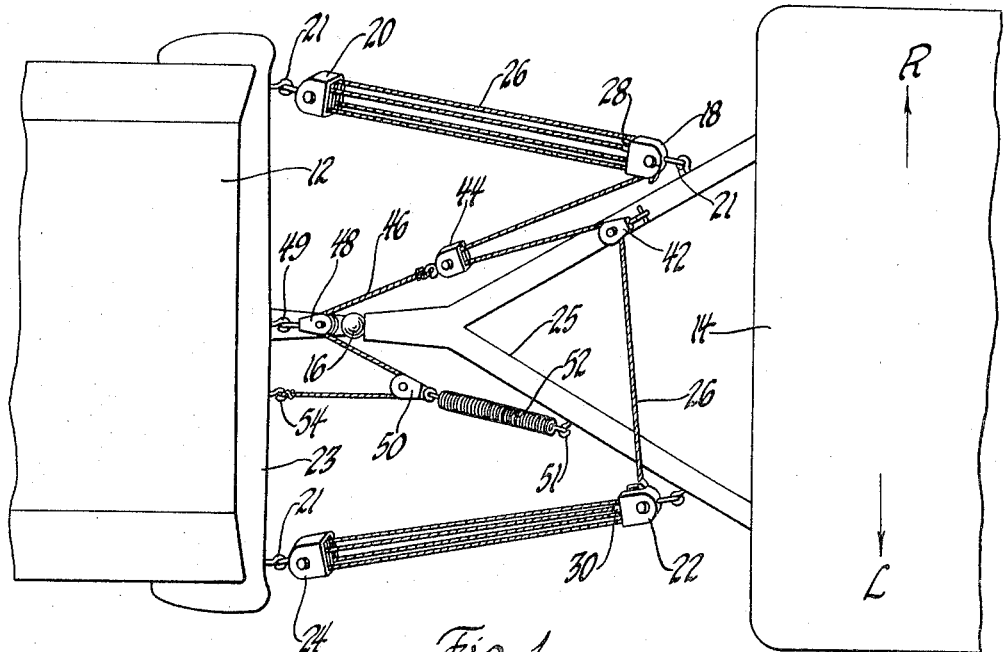
FIGURE 1 is a plan view of an illustrative embodiment of the anti-oscillation system of the present invention.

Referring now to the drawings, wherein like reference characters designate like or corresponding parts throughout the several views, there is shown in FIGURE 1 an anti-oscillation system of the present invention for utilization between first and second members which are articulably connected together for relative rotational movement about a common axis. The first such member 12 is shown as a towing vehicle which tows a towed vehicle 14 through a connection 16 which allows relative rotational movement between the towing vehicle 12 and the towed vehicle 14 about the common vertical axis passing through the connection 16. The anti-oscillation system comprises means inter-connecting the towing vehicle 12 and the towed vehicle 14 to prevent relative rotational movement about the connection 16 when forces, which are applied for less than a predetermined duration, are applied to either the towed vehicle 14 or the towing vehicle 12 to urge relative rotation therebetween, and which allows free relative rotational movement between the towing vehicle 12 and the towed vehicle 14 in response to forces which are applied to either vehicle for greater than a predetermined duration.

The anti-oscillation system of the present invention utilizes the mechanical advantage principle inherent in a block and tackle system. By running a flexible line back and forth between two pair of points respectively on the towed vehicle 14 and the towing vehicle 12 on opposite sides of the common axis of rotation at the connection 16, sudden forces which tend to cause oscillatory movements between the vehicles are counteracted and fishtailing of the towed vehicle 14 is prevented as it is being towed along the highway by the towing vehicle 12. The invention, therefore, may be practiced by any means which allows a deflexible line to be woven or passed back and forth between the towing vehicle 12 and the towed vehicle 14 at two pairs of points, each pair being displaced on opposite sides of the common axis of rotation. However, in the embodiment illustrated, pulleys are utilized for providing the points between which the flexible line is passed.

A first pulley 18 is secured to the towed vehicle 14 at a point in a lateral direction from the connection 16 between the vehicles, and a second pulley 20 is secured to the towing vehicle 12 at a point laterally displaced from the connection 16 between the vehicles. A third pulley 22 is secured to the towed vehicle 14 on the opposite side of the connection 16 from the first pulley 18, as is the fourth pulley 24 secured to the towing vehicle 12 on the opposite side of the connection 16 from the second pulley 20. A flexible means or line 26 is attached by a first end 28 to the towed vehicle 14. In the embodiment illustrated, the line 26 is secured to the towed vehicle 14 by being attached to the pulley 18, which pulley in turn is secured to the towed vehicle 14 in any convenient manner, such as by an eyelet 21. The line 26 then passes to pulley 20, then back to pulley 18, then back to pulley 20, and back to pulley 18. The line 26 may then be secured to any appropriate means for applying tension thereto and allowing it to feed in and out of pulley 18. For example, the line 26 after passing the last time through pulley 18 may be secured to a spring attached to either vehicle, which spring allows the line 26 to move in and out of pulley 18. The pulleys 18 and 20 counteract any sudden forces which are applied to either of the vehicles to urge the vehicles to rotate relative one another whereby the distance between the pulleys 18 and 20 is increased. This is due to the mechanical advantage inherent in such a system wherein a sudden force urging the pulleys 18 and 20 apart, which is of short duration, is insufficient to overcome inertia of the system; however, a constantly applied force of sufficient duration will freely move the pulleys 18 and 20 apart. As is evident from the drawings, when the relative rotation between the towing vehicle 12 and the towed vehicle 14 is such that the towed vehicle 14 is rotating in a counterclockwise direction as viewed in FIGURE 1, the pulleys 18 and 20 must be disposed on the vehicles so that the distance between the pulleys 18 and 20 is constantly decreasing and whereby, as will be hereinafter more fully disclosed, the opposite pulleys 22 and 24 are being pulled apart. It is clear, therefore, that the invention may be practiced by utilizing a separate line for each pair of pulleys which is fed in and drawn out of a pair of pulleys on each side of the common axis of rotation.

In the embodiment illustrated in FIGURE 1, however, the line 26, after it has been woven back and forth a plurality of times between the pulleys 18 and 20, passes to the pulleys 22 and 24 where it is passed back and forth therebetween and secured at the second end 30 thereof to the towed vehicle 14, in this case by being secured to the pulley 22. As is apparent from FIGURE 1, when the relative rotation between the towing vehicle 12 and the towed vehicle 14 is in a first direction, one pair of pulleys will be moving in a direction closer together as the opposite pair of pulleys will be moving apart. This allows the line 26 to move from one pair of pulleys to the other depending upon the direction of the relative rotation.

Figure 2:
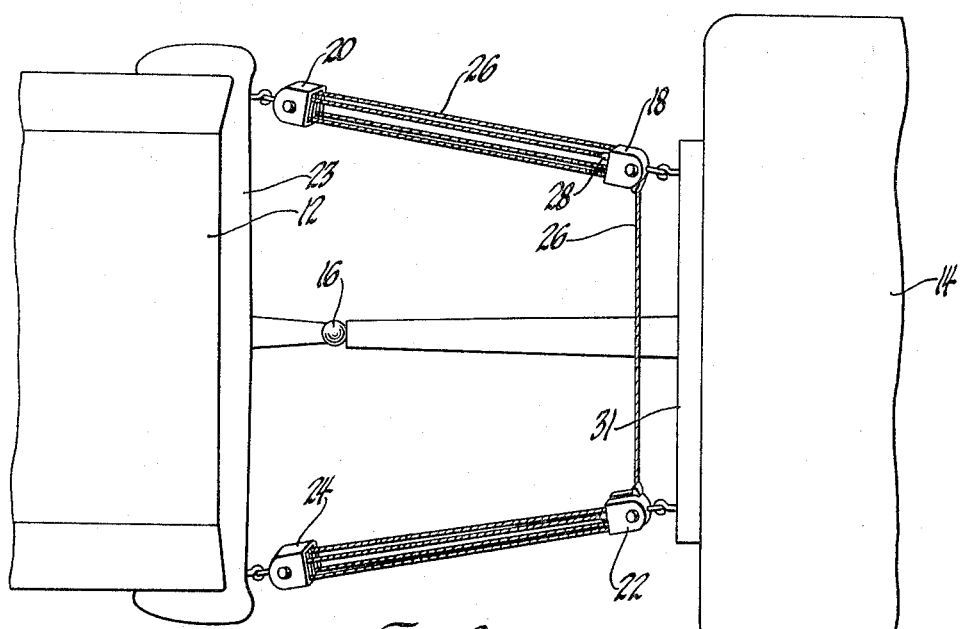
FIGURE 2 is a plan view of an alternative embodiment of the anti-oscillation system of the present invention.
Figure 3:
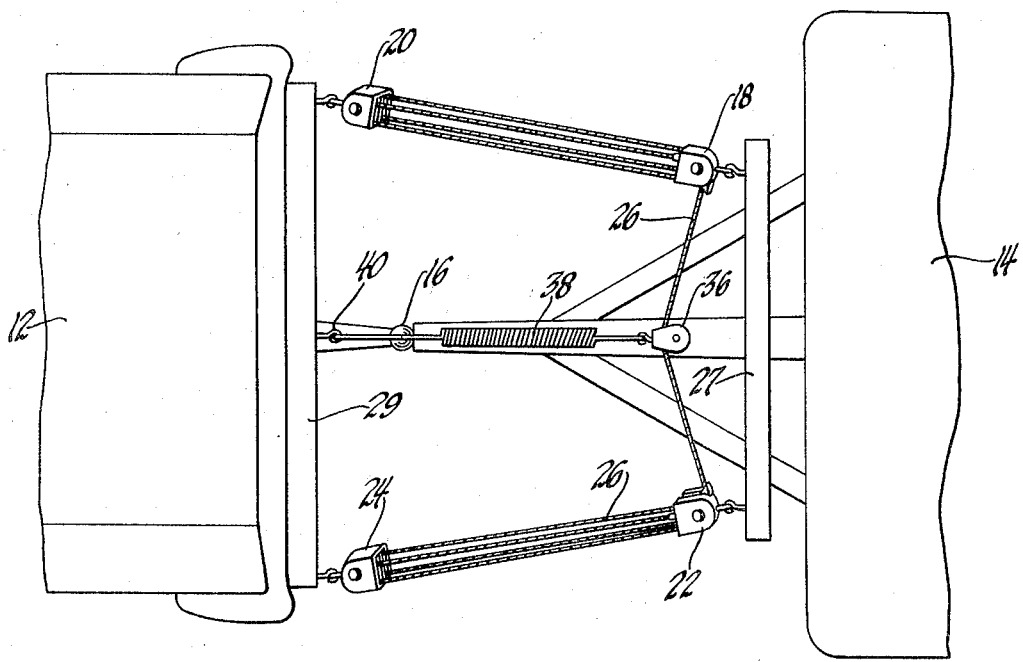
FIGURE 3 is a plan view of yet another embodiment of the anti-oscillation system of the present invention.

FIGURE 2 illustrates an embodiment of the invention wherein line 26 passes directly from pulley 18 to pulley 22; however, it is desirable to take up any slack which might occur in line 26 as it passes back and forth between the two pairs of pulleys. A simple slack relieving system is shown in FIGURE 3 wherein a pulley 36 is attached to the line 26 as it passes between the pulleys 18 and 22, which pulley 36 is biased toward the towing vehicle 12 by means of a spring 38 attached by eyelet 40 to the towing vehicle 12.

A most satisfactory tension applying means, which takes up any slack in the line 26 as it passes between the two opposite pairs of pulleys, is illustrated in FIGURE 1. The system utilizes a pulley 42 attached to the towed vehicle 14, and a pulley 44 which is biased toward the towing vehicle 12. The line 26 passes from pulley 18 to pulley 44, then to pulley 42, then to pulley 22. Pulley 44 takes up any slack in the line 26 and applies tension thereto as the line passes back and forth between the pairs of pulleys 18 and 20, and 22 and 24. Tension is applied to pulley 44 by means of a cord 46 which is connected to pulley 44 and passes over a pulley 48 which is attached to the towing vehicle 12 by eyelet 49. The cord 46 then passes to a pulley 50, which is secured to the towed vehicle 14 by way of a spring 52, which in turn is secured to the towed vehicle 14 by eyelet 51. Then the cord 46 passes from pulley 50 to an attachment 54 on the towing vehicle 12.

The slack system illustrated in FIGURE 1 has been found to be very satisfactory since it is able to utilize the tension applying abilities of a spring, such as spring 52, over double the distance which the spring is stretched. In other words, by utilizing the pulley 50, in conjunction with the spring 52 and cord 46 attached to the pulley 44, for approximately every inch of movement of the pulley 44, the pulley 50, hence spring 52, moves one half that distance, or one-half inch. This is due to the arrangement of the cord 46 passing from pulley 48 through pulley 50 to attachment 54. This enables the spring 52 to apply a constant tension over a full inch of travel of pulley 44 while moving only one-half inch. This embodiment of the slack system has been proved very satisfactory and it is to be noted that the system may also be utilized by attaching the cord 46 to pulley 48 instead of to eyelet 54. Also, the spring 52 may be attached to pulley 42 instead of eyelet 51. By connecting the slack system to the vehicles in this manner the number of attaching points on each vehicle are reduced.

Although the slack system illustrated in FIGURE 1 has proved very satisfactory, modifications of that system will also serve the desired function. For example, the cord 46, after it has passed through pulley 48, may be attached directly to the spring 52. In such an arrangement the spring 52 will move the same distance that pulley 44 moves.

As alluded to previously, the essence of the ability of the anti-oscillation system of the present invention to dampen relative movements between the towing vehicle 12 and the towed vehicle 14 is attributable to the mechanical advantage provided by stretching a line through a series of loops between the two vehicles on either side of the common axis of rotation. As illustrated in FIGURE 1, the line 26 passes between the pulleys 18 and 20 to form four strands therebetween then passes to the pulleys 22 and 24 to provide four strands therebetween. It is to be noted, however, that any number of strands may be provided between the respective pairs of pulleys to prevent oscillation or fishtailing of the towed vehicle 14; the number of strands between each pair of pulleys will depend upon the size of the towing vehicle and the towed vehicle and the magnitude of the forces they are likely to encounter which tend to cause relative rotation between the two vehicles.

As alluded to previously, the pulleys must be placed on the vehicles so that the distance between one pair, i.e. 18 and 20, is constantly decreasing when the relative rotation between the vehicles is in one direction while the distance between the opposite pair, i.e. 22 and 24, is increasing, and vice versa. This limitation, however, allows for many various methods of attaching the anti-oscillation system to the respective vehicles. FIGURE 1 shows the pulleys attached respectively to the towing vehicle 12, bumper 23 and to the split tongue 25 of the towed vehicle. FIGURE 3 shows that the pulleys 18 and 22 may be attached to a cross-bar 27 which may be secured to any type tongue used with the towed vehicle. FIGURE 3 also shows a hitch-bar 29 which may be attached to the towing vehicle for supporting the hitch and the pulleys 20 and 24. FIGURE 2 shows the pulleys 18 and 22 attached directly to the trailer through a member 31. These are but a few illustrations of the manner in which the anti-oscillation system may be attached between the vehicles and it is to be understood that it is within the confines of this invention to attach the pulleys to the vehicle in any appopriate manner so long as the relationship alluded to above is maintained.

The operation of the anti-oscillation device of the present invention should be apparent at this point from the previous discussion; however, the operation of the device will be briefly described to afford a more complete understanding of the device. In the normal operation of the embodiment shown in FIGURE 1, the towing vehicle 12 pulls the towed vehicle 14 along the highway in a generally straight line and the towed vehicle 14, due to irregularities in the surface of the road, winds or other aerodynamic forces, or loading, etc., may tend to fishtail or oscillate about the common axis of rotation at the connection 16 between the vehicles. If the two vehicles are traveling along the highway and due to such forces the towed vehicle 14 tends to move in the direction of the arrow R, the strands between the pulleys 22 and 24 will move through the pulleys so as to allow the pulleys 22 and 24 to move apart. If the force which tends to move the towed vehicle 14 in the direction of the arrow R is sudden and of short duration, the static friction or inertia, due to the mechanical advantage of the pulleys 22 and 24 will not allow the line 26 to move within pulleys 22 and 24 and, thus, prevents the trailer from rotating in response to a force which is active less than a predetermined duration. However, if the force applied to the towed vehicle 14, or trailer, to urge it to rotate about the common vertical axis at the connection 16 to move the trailer, or towed vehicle, in the direction of the arrow R, lasts for a greater period of time than a predetermined duration so as to overcome the static friction or inertia of the pulley system 22 and 24, the line 26 freely moves through the pulleys 22 and 24 to allow the trailer, or towed vehicle 14, to rotate freely relative to the towing vehicle 12. In essence then, the fishtailing or oscillatory movement of the towed means relative to the towing means is prevented due to the inherent nature of the two pulleys 22 and 24 wherein when a sharp and rapid force is applied to urge the two pulleys apart, the pulleys do not move apart, but where, in turn, a force of a constant steady application is applied to pull the pulleys 22 and 24 apart, they readily move apart allowing the line 26 to pass therethrough. The pulleys 18 and 22 are operated in exactly the same fashion in reaction to forces urging the towed vehicle 14 to move in the direction of the arrow L wherein they do not respond to sudden forces of short duration but do allow the line 26 to freely pass thereover in response to a steady constant force. It is to be noted that when the trailer is rotating or moving in the direction of the arrow R, pulleys 18 and 20 will be moving in relation to each other so that the distance between the pulleys is always decreasing. This allows the line 26 to pass from pulley 18 to pulley 22 to allow the distance between pulleys 22 and 24 to increase. Conversely, if the trailer is moving in a relative rotation to the towing vehicle 12 by moving in the direction of the arrow L, the pulleys 22 and 24 are moving relative to each other so as to decrease the distance therebetween allowing the line 26 to pass from pulley 22 to pulley 18 to allow pulley 18 to move farther away from pulley 20.

It has further been found that in certain combinations of towed and towing vehicles that the application of a braking force to the pulley 44, so that the pulley resists the movement of the line 26 thereover, very small and minimal oscillations of the towed vehicle 14 are dampened. With such a pulley 44 utilizing a braking means in conjunction with a pair of pulleys on either side of the axis of rotation between the towing and towed vehicle nearly all oscillations or fishtailing of the towed vehicle are eliminated.

Figure 4:
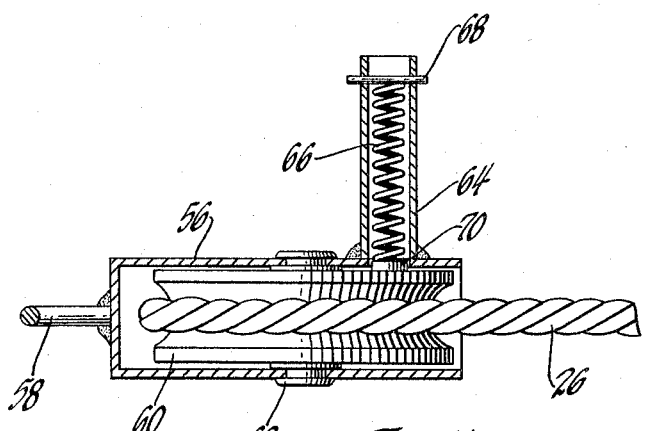
FIGURE 4 is an enlarged cross-sectional view of an illustrative pulley which may be used in the anti-oscillation system of the present invention.

An illustrative embodiment of a pulley utilizing a braking device is shown in FIGURE 4. Any type pulley which resists movement of a line thereover may be used as pulley 44 in the slack system illustrated in FIGURE 1, and the pulley of FIGURE 4 is one such pulley. The pulley has a housing 56 on which is attached a loop or eyelet 58 for connecting the pulley to a support. A wheel 60 is rotatably supported in the housing 56 by an axle 62. Attached to the housing 56 in any convenient manner, such as by welding, is a tubular member 64 which encloses a spring 66. The spring 66 is held in the tubular member 64 by a pin 68. A puck or brake shoe type member 70 rides against the wheel 60 and is held thereagainst by the spring 66. The puck 70 acts as a brake to resist rotational movement of the wheel 60, hence resists movement of the line 26 through the pulley.

The device of the present invention also serves as a safety connection device. That is to say, that in the event the trailer, or towed vehicle 14, became disconnected from the towing vehicle 12, such as at the connection 16, the anti-oscillation device would hold the towing vehicle 12 and the towed vehicle 14 together. It is sometimes required by law that a towed vehicle, or trailer, have an additional means for connecting the towing vehicle to the towed vehicle so that in the event the main hitch becomes disconnected, the additional means would suffice to keep the towed vehicle under control. It is clear, therefore, that the present invention, in addition to serving as an anti-oscillation device, also serves as such a safety connection.

As is apparent from the foregoing description, the present invention provides a unique anti-oscillation or anti-fishtailing device for dampening the oscillation between two members which are relatively rotatable about a common axis, such as, for example, a towed vehicle and a towing vehicle, which is simple in design and capable of enabling a towed vehicle to be drawn along a roadway at higher speeds and in a safer manner.

The invention has been described in an illustrative manner and it is to be understood that the terminology which has been used herein is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

We claim:

1. An anti-oscillation system for utilization between first and second members which rotate relative to one another about a common axis and comprising a first line adapted to be connected at a first end thereof to one of said first and second members, a first means adapted to be connected to said first member for allowing said first line to be retained in running relationship with said first member, a second means adapted to be connected to said second member for allowing said first line to be retained in running relationship with said second member, said first line passing a plurality of times between said first and second means, a second line adapted to be connected at a first end thereof to one of said first and second members, a third means adapted to be connected to said first member for allowing said second line to be retained in running relationship with said first member, a fourth means adapted to be connected to said second member for allowing said second line to be retained in running relationship with said second member, said second line passing a plurality of times between said third and fourth means, means associated with the respective second ends of said first and second lines so that said first and second means and said third and fourth means may be connected to said members so that upon relative rotation between said members said first line will be pulled through said first and second means to allow the distance therebetween to increase as said second line is pulled through said third and fourth means as the distance therebetween decreases and whereupon said first and second lines operate in the reverse manner upon relative rotation between said first and second members in the opposite direction.

2. An anti-oscillation system in combination with first and second members which rotate relative to one another about a common axis comprising a first line connected at one end thereof to one of said members and woven a plurality of times between and in running relationship with said first and second members, a second line connected at one end thereof to one of said members and woven a plurality of times between and in running relationship to said first and second members, means associated with the other ends of said lines so that upon relative rotation between said members said first line will be pulled through said first and second members to allow the distance therebetween to increase as said second line is pulled through said first and second members as the distance therebetween decreases, and whereupon the relative rotation between said first and second members is reversed the first and second lines operate in the reverse manner.

3. An anti-oscillation system for utilization between first and second members which rotate relative to one another about a common axis and comprising a first line adapted to be connected at one end thereof to one of said first and second members, a first means adapted to be connected to said second member for allowing said first line to be retained in running relationship with said second member, a second means adapted to be connected to said first member for allowing said first line to be retained in running relationship with said first member, said first line passing a plurality of times between said first and second means, a second line adapted to be connected at one thereof to one of said first and second members, a third means adapted to be connected to said second member for allowing said second line to be retained in running relationship with said second member, a fourth means adapted to be connected to said first member for allowing said second line to be retained in running relationship with said first member, said second line passing a plurality of times between said third and fourth means so that said first and second means and said third and fourth means may be connected to said members so that upon relative rotation between said first and second members one pair of said first and second means and said third and fourth means move closer together as the other pair move apart, and at least one means adapted to be connected to one of said members for retaining and applying tension to the respective second ends of said first and second lines.

4. An anti-oscillation system in combination with first and second members which are rotatable relative to one another about a common axis comprising first block and tackle means disposed between said first and second members on one side of said axis for retarding oscillatory motion in a first direction, and second block and tackle means disposed between said first and second members on the other side of said axis for retarding oscillatory motion in a direction opposite to said first direction.

5. An anti-oscillation system for utilization between first and second members which rotate relative to one another about a common axis comprising first pulley means adapted to be attached to said first member, second pulley means adapted to be attached to said second member, a line adapted to be secured at a first end thereof to one of said first and second members and passing between said first and second pulley means, third pulley means adapted to be attached to said first member, fourth pulley means adapted to be attached to said second member, said line passing from one of said first and second pulley means to one of said third and fourth pulley means and passing between said third and fourth pulley means, and said line adapted to be secured at the second end thereof to one of said first and second members.

6. A system as set forth in claim 5 wherein said line passes a plurality of times over said first and second pulley means respectively, and said line passes a plurality of times over said third and fourth pulley means respectively.

7. A system as set forth in claim 5 wherein said first end of said line is attached to said first pulley means, said line then passing to said second pulley means, then to said first pulley means, then to said second pulley means, then to said first pulley means, then to said third pulley means, then to said fourth pulley means, then to said third pulley means, then to said fourth pulley means, then attached to said third pulley means whereby said respective pulley means may be attached to said member, and upon relative rotation between said first and second members in one direction said first and second pulley means move closer together and said line passes from said first pulley means to said third pulley means and upon relative rotation between said first and second members in the opposite direction said third and fourth pulley means move closer together and said line passes from said third pulley means to said first pulley means.

8. A system as set forth in claim 5 further including tension means disposed between said first and second pulley means and said third and fourth pulley means for maintaining tension in said line as it passes from said first and second pulley means to said third and fourth pulley means.

9. A system as set forth in claim 8 wherein said tension means comprises a first pulley over which said line passes which first pulley is biased in a line tensioning direction.

10. A system as set forth in claim 9 wherein said first pulley resists the movement of said line thereover whereby slight oscillatory movements between said first and second members are dampened.

11. An anti-oscillation device in combination with a towing and a towed vehicle and which vehicles are connected together by means allowing relative rotation between said vehicles and comprising a first pair of pulleys respectively attached to said towing vehicle and said towed vehicle, first line means attached at a first end thereof to one of said pulleys of said first pair and making a plurality of passes back and forth between said first pair of pulleys, a second pair of pulleys respectively attached to said towing vehicle and said towed vehicle, second line means attached at a first end thereof to one of said pulleys of said second pair of pulleys and making a plurality of passes back and forth between said second pair of pulleys, said first pair of pulleys disposed for preventing relative rotation in a first direction in response to a force applied less than a predetermined duration and allowing free relative rotation in said first direction in response to a force applied longer than said predetermined duration, said second pair of pulleys disposed for preventing relative rotation in a direction opposite to said first direction in response to a force applied less than a predetermined duration and allowing free relative rotation in said direction opposite said first direction in response to a force applied longer than said predetermined duration, and line tension means connected to the second ends respectively of said first and second lines for applying tension thereto.

12. A device as set forth in claim 11 wherein said line tensioning means includes means to prevent minimal movements of said second ends for preventing minimal oscillatory movements between said vehicles.

13. A device as set forth in claim 11 wherein said second ends of said first and second lines respectively are secured together to form one continuous line, said line tension means is a pulley over which said continuous line passes, which pulley is biased in a line tensioning direction.

14. A device as set forth in claim 13 wherein said pulley has a brake means to retard the rotary movement thereof for dampening oscillatory movements between said vehicles below a predetermined magnitude.

15. In combination with a towing vehicle and a towed vehicle which are rotatably attached by a connection; a first pair of pulleys respectively attached to said towing vehicle and said towed vehicle on a first side of said connection, a second pair of pulleys respectively attached to said towing vehicle and said towed vehicle on a second side of said connection, a flexible means attached by one end thereof to one of said pulleys of said first pair and passed a plurality of passes between said first pair of pulleys then passed a plurality of passes between said second pair of pulleys and attached by the second end thereof to one of said pulleys in said second pair for inhibiting sudden movements of relative rotation between said towing vehicle and said towed vehicle and for allowing positive constant movements of relative rotation between said towing vehicle and said towed vehicle.

16. The combination as set forth in claim 15 further including a tension means operably connected to said flexible means between said first and second pair of pulleys for maintaining a tension on said flexible means.

17. The combination as set forth in claim 16 further including a braking means attached to said tension means to resist minimal movements of said flexible means for preventing minimal oscillatory movements between said towing vehicle and said towed vehicle.

18. An anti-oscillation device for use between a towing vehicle and a towed vehicle which are articulably connected together for relative rotation about a vertical axis comprising a first pair of flexible line passing means, a second pair of flexible line passing means, and a flexible line connected to one of said first pair of flexible line passing means and successively passing between said first pair of flexible line passing means, then passing to said second pair of flexible line passing means for successively passing between said second pair of flexible line passing means, then connected to one of said second pair of flexible line passing means whereby one of said flexible line passing means of each of said first and second pair may be attached to said towing vehicle and the other of said flexible line passing means of each of said first and second pair may be attached to said towed vehicle thereby to prevent relative rotational movement between said vehicles in response to forces of less than a predetermined duration and allowing free relative rotation therebetween in response to forces of more than a predetermined duration.

19. An anti-oscillation device in combination with a towed vehicle and a towing vehicle which is articulably connected to said towed vehicle to allow relative rotation therebetween about a vertical axis and comprising a first pulley removably connected to said towing vehicle at a point laterally displaced from said axis in a first direction, a second pulley removably connected to said towed vehicle at a point laterally displaced from said axis in said first direction, a third pulley removably connected to said towing vehicle at a point laterally displaced from said axis in a direction opposite to said first direction, a fourth pulley removable connected to said towed vehicle at a point laterally displaced from said axis in said direction opposite to said first direction, said first and second pulleys being disposed so that the distance therebetween decreases as said vehicles rotate relative to one another in a first direction, said third and fourth pulleys being disposed so that the distance therebetween decreases as said vehicles rotate relative to one another in a direction opposite to said first direction, a line being connected by one end thereof to one of said first pulley and said second pulley, said line passing between said first and second pulleys to form a plurality of strands therebetween, and said line then passing between said third and fourth pulleys to form a plurality of strands therebetween, said line being connected by the second end thereof to one of said third pulley and said fourth pulley.

20. A device as set forth in claim 19 further including a first means operably connected to said line as said line passes from said first and second pulleys to said third and fourth pulleys for taking up slack in said line.

21. A device as set forth in claim 20 wherein said first means comprises a fifth pulley over which said line passes, and said pulley being biased in a line tensioning direction.

22. A device as set forth in claim 20 wherein said first means comprises a fifth pulley connected to said towed vehicle over which fifth pulley said line passes, a sixth pulley over which said line passes, and a second means for biasing said sixth pulley toward said towing vehicle.

23. A device as set forth in claim 22 wherein said sixth pulley has a brake means for retarding the movement of said line therethrough whereby minimal oscillations between said vehicles are dampened.

24. A device as set forth in claim 22 wherein said second means comprises a seventh pulley attached to said towing vehicle, a spring attached to said towed vehicle, and a cord connected to said sixth pulley passing over said seventh pulley and connected to said spring for biasing said sixth pulley toward said towing vehicle.

25. A device as set forth in claim 22 wherein said second means comprises a seventh pulley attached to said towing vehicle, a spring attached to said towed vehicle, an eighth pulley attached to said spring, and a cord connected at a first end thereof to said sixth pulley passing over said seventh pulley and said eighth pulley and connected at a second end thereof to said towing vehicle.

26. A device as set forth in claim 25 wherein said seventh pulley is attached to said towing vehicle in juxtaposition to said vertical axis.

27. A device as set forth in claim 20 wherein said first means comprises a fifth pulley connected to said towing vehicle over which fifth pulley said line passes, a sixth pulley over which said line passes, and a second means for biasing said sixth pulley toward said towed vehicle.

28. A device as set forth in claim 27 wherein said sixth pulley has a brake means for retarding the movement of said line therethrough whereby minimal oscillations between said vehicles are dampened.

29. A device as set forth in claim 27 wherein said second means comprises a seventh pulley attached to said towed vehicle, a spring attached to said towing vehicle, and a cord connected to said sixth pulley passing over said seventh pulley and connected to said spring for biasing said sixth pulley toward said towing vehicle.

30. A device as set forth in claim 27 wherein said second means comprises a seventh pulley attached to said towed vehicle, a spring attached to said towing vehicle, an eighth pulley attached to said spring, and a cord connected at a first end thereof to said sixth pulley and said eighth pulley and connected at a second end thereof to said towed vehicle.

31. A device as set forth in claim 30 wherein said seventh pulley is attached to said towed vehicle in juxtaposition to said vertical axis.

32. An anti-oscillation device in combination with a towed vehicle and a towing vehicle which is articulably connected to said towed vehicle to allow relative rotation therebetween about a common axis, a first pulley removably connected to said towed vehicle, a second pulley removably connected to said towing vehicle, a third pulley removably connected to said towed vehicle, a fourth pulley removably connected to said towing vehicle, said first and second pulleys being disposed so that the distance therebetween decreases as said vehicles rotate relative to one another in a first direction, said third and fourth pulleys being disposed so that the distance therebetween decreases as said vehicles rotate relative to one another in a direction opposite to said first direction, a line connected at one end thereof to said first pulley and passing to said second pulley, then to said first pulley, then to said second pulley, then to said first pulley, then to a fifth pulley, then to a sixth pulley secured to said towed vehicle, then to said third pulley, then to said fourth pulley, then to said third pulley, then to said fourth pulley, then connected at the second end thereof to said third pulley, a spring attached to said towed vehicle, a seventh pulley attached to said spring, an eighth pulley attached to said towed vehicle, a cord attached by one end thereof to said fifth pulley and passing over said eighth pulley, then over said seventh pulley, then secured to said towing vehicle, and a brake means attached to said fifth pulley to resist the movement of said line therethrough.

References Cited by the Examiner

UNITED STATES PATENTS

| | | | |
|---|---|---|---|
| 2,612,382 | 9/1952 | Landis | 280—456 |
| 2,691,533 | 10/1954 | Koontz | 280—405 |
| 2,718,410 | 9/1955 | Simmons | 280—406 |
| 2,762,634 | 9/1956 | Moseley | 280—432 |
| 2,808,272 | 10/1957 | Reese | 280—406 |
| 3,116,074 | 12/1963 | Koontz | 280—405 |

FOREIGN PATENTS 840,845  7/1960  Great Britain.

LEO FRIAGLIA, *Primary Examiner.*